3,534,125
BIS(PHOSPHINYL)PHOSPHINATES
Karl O. Knollmueller, Hamden, Conn., assignor to
Olin Mathieson Chemical Corporation
No Drawing. Filed Feb. 14, 1967, Ser. No. 615,921
Int. Cl. C07f *9/30;* C08f *45/58;* A01n *9/36*
U.S. Cl. 260—932                                    10 Claims

ABSTRACT OF THE DISCLOSURE

Novel phosphinylmethylene phosphinic acids, salts and esters are provided which are useful as sequestrants, inhibitors, stabilizers, plasticizers, plant growth regulants and for other purposes.

---

This invention relates to novel compositions of matter and to processes for producing them. More particularly, this invention relates to novel compositions of matter having the formula $$[(RO)_2P(:O)CH_2]_xP(:O)(OR')_{3-x}$$

where $x$ is 2 and the R and R' are independently selected from the group consisting of H, NR''$_4$, metal and hydrocarbyl of 1 to 18 carbons and R'' is independently selected from the group consisting of H, NH$_2$, lower alkyl of 1 to 6 carbons, cycloalkyl of 3 to 6 carbons and aryl of 6 to 10 carbons. In the above formula the symbol (:O) is used, as conventional, to indicate an oxygen doubly bound, in these compounds, to phosphorus. This symbol has the same meaning as the more expanded symbol, including the phosphorus, also written as P=O.

The principal object of this invention is to provide the heretofore unknown compositions of this invention. Another object is to provide processes for preparing them. Still another object is to provide novel compounds useful as sequestrants, as inhibitors for stabilization of polymers and for other purposes. These objects have been accomplished in accordance with the invention disclosed herein.

The compounds having the above formula are acids, salts, esters and mixed types including acid salts, acid-esters, salt-esters and acid-salt-esters. When all of R and R' are H, the compounds are acids, when all of R and R' are metal, the compounds are salts and when all of R and R' are hydrocarbyl, the compounds are esters. When at least one of R and R' is H and at least one is metal, the compounds are acid salts; when at least one of R and R' is H and at least one is hydrocarbyl, the compounds are acid-esters; when at least one of R and R' is metal and at least one is hydrocarbyl, the compounds are salt esters and when at least one of R and R' is H, at least one is metal and at least one is hydrocarbyl, the compounds are acid-salt-esters. Exemplary species of these types are shown in Table I.

The term "metal" includes alkali metals, alkaline earth metals, rare earth metals and heavy metals. The alkali metals appear in Group I of the Periodic System and include lithium, sodium, potassium, rubidium and cesium. The rare earth metals include elements having atomic numbers 57 to 71 inclusive. The heavy metals appear in Groups I to VIII, Subgroups A and B, inclusive, of the Periodic System and have atomic numbers 22 to 83 inclusive. Exemplary species of salts of these metals according to this invention appear in Table I. The metal compounds of this invention are either simple salts of the acids of the formula above or, in some cases, complex chelates of the metal ion and the acids. The term "salts" as used herein includes both types of metal compounds and mixed types where part of the metal is combined as salt and part as chelate. The metal salts are frequently simple compositions where analyses agree well with theoretical formulas. However, the polyvalent metals combine with the polybasic acids, especially the pentabasic acid and the hexabasic acid in a variety of proportions. In addition, non-stoichiometric proportions of metal are frequently chelated by these polybasic acids. For these reasons, analytic ratios of metal to phosphorus and other elements in these salts frequently differ from simple stoichiometric ratios.

The term "hydrocarbyl" includes alkyl, alkenyl, cycloalkyl, cycloalkenyl, alkylcycloalkyl, aryl, alkaryl, aralkyl of 1 to 18 carbons. Exemplary species appear in Table I.

TABLE I.—EXEMPLARY SPECIES

| Formula | Name |
|---|---|
| [(C$_2$H$_5$O)$_2$P(:O)CH$_2$]$_2$P(:O)OC$_2$H$_5$ | Bis(diethoxyphosphinylmethylene) phosphinic acid ethyl ester. |
| [(C$_2$H$_5$O)$_2$P(:O)CH$_2$]$_2$P(:O)OC$_6$H$_5$ | Bis(diethoxyphosphinylmethylene) phosphinic acid phenyl ester. |
| [(HO)$_2$P(:O)CH$_2$]$_2$P(:O)OH | Bis(dihydroxyphosphinylmethylene) phosphinic acid. |
| [(NH$_4$O)(HO)P(:O)CH$_2$]$_2$P(:O)ONH$_4$ | Bis(dihydroxyphosphinylmethylene) phosphinic acid triammonium salt. |
| [(N$_2$H$_5$O)(HO)P(:O)CH$_2$]$_2$P(:O)ON$_2$H$_5$ | Bis(dihydroxyphosphinylmethylene) phosphinic acid trihydrazinium salt. |
| [(KO)$_2$P(:O)CH$_2$]$_2$P(:O)(OK) | Bis(dihydroxyphosphinylmethylene) phosphinic acid pentapotassium salt. |
| [(C$_2$H$_5$O)(NaO)P(:O)CH$_2$]$_2$P(:O)OH | Bis(mono-ethoxyphosphinylmethylene) phosphonic acid di sodium salt. |
| [ZnO$_2$P(:O)CH$_2$]$_2$P(:O)OH | Bis(dihydroxyphosphinylmethylene) phosphinic acid di zinc salt. |
| [(HO)$_2$P(:O)CH$_2$]$_3$P:O or H$_6$(CH$_2$)$_3$P$_4$O$_{10}$ | Tris(dihydroxyphosphinylmethyl) phosphine oxide. |

Tetraethyl methylenediphosphonate was prepared by Moedritzer et al., J. Inorg. Nucl. Chem. 22, 297 (1962) and by earlier coworkers. However, the art compounds containing but one methylene group and only two phosphorus atoms are difficult to prepare and do not compare as sequestrants, inhibitors, stabilizers and for other purposes with the compounds of this invention.

The compositions of this invention of the formula above where $x=2$ are prepared in a series of steps comprising a first step in which bis(hydroxymethyl) phosphinic acid, an article of commerce, is converted into bis(chloromethyl) phosphinic acid chloride by reaction suitably with thionyl chloride. The resulting acid chloride is converted in a second step into an ester of bis(chloromethyl) phosphinic acid by reaction with any suitable hydrocarbyl hydroxyl compound. In a third step, the chloromethyl ester is converted into the polyhydrocarbyl ester by reaction with any suitable trihydrocarbyl phosphite. The resulting esters are hydrolyzed to form the corresponding polybasic acids and their salts.

In the first step of converting bis(hydroxymethyl) phosphinic acid by means of thionyl chloride into bis(chloromethyl) phosphinic acid chloride, the reaction is appropriately carried out by adding one reactant to the other in either order, preferably using an excess of thionyl chloride over the stoichiometrically required ratio of 3 moles of thionyl chloride per mole of bis(hydroxymethyl) phosphinic acid:

$$(HOCH_2)_2P(:O)OH + 3SOCl_2 \rightarrow (ClCH_2)_2P(:O)Cl + 3SO_2 + 3HCl$$

It is convenient to add the acid, warmed to reduce its viscosity, to excess thionyl chloride. The thionyl chloride boils at 79° C. at atmospheric pressure which limits the reaction temperature. Evolution of SO$_2$ and HCl shows that the reaction starts immediately and after the addition is completed, the mixture is refluxed until gas evolution ceases. Usually 2 to 8 hours is sufficient. Excess thionyl chloride is removed by distillation and the product is vacuum distilled. The resulting bis(chloromethyl) phosphinyl chloride is an intermediate in the preparation of the compounds of this invention.

The intermediate esters are prepared by reaction of bis(chloromethyl) phosphinic acid chloride with any suitable hydrocarbyl hydroxyl compound:

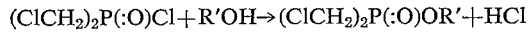

Conveniently the reactants are mixed with suitable temperature control and provision for escape of HCl. An excess of hydroxyl compound is usually convenient to act as solvent. To complete the reaction, warming in a stream of inert gas and reduction of pressure to remove HCl are conventional devices.

Suitable hydrocarbyl hydroxyl compounds include aliphatic and cycloaliphatic alcohols, particularly the primary and secondary alcohols and the phenols. Preferably the hydroxyl compounds contain 1 to 18 carbons. Exemplary hydrocarbyl hydroxyl compounds include:

| | |
|---|---|
| Methanol | n-Dodecanol |
| Ethanol | n-Octadecanol |
| n-Propanol | Cyclohexanol |
| i-Propanol | Phenol |
| sec.-Butyl alcohol | o-Cresol |
| Neo-pentanol | p-Chlorophenol |
| 2-Ethylhexanol | alpha-Naphthol |

Mixtures of hydrocarbyl hydroxyl compounds are suitable for use including, for example, commercial lauryl alcohol containing largely n-dodecanol with lesser amounts of higher and lower alkyl alcohols.

The esters of this invention are prepared by the Michaelis-Arbusov reaction of tri-hydrocarbyl phosphite with the intermediate chloromethyl esters. This reaction proceeds slowly and can be done in two steps, isolating the intermediate monochloromethyl ester if desired:

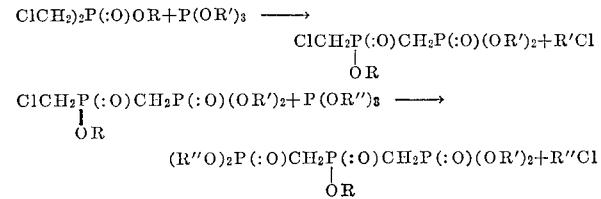

In these reactions R, R' and R'' are hydrocarbyl and may be the same or different. The phosphite esters used are suitably derived from the same hydrocarbyl hydroxyl compounds as described for the previous step, including the phosphite esters of aliphatic and cycloaliphatic alcohols and phenols. Among suitable phosphite esters are the following commercially available phosphite esters, for example:

Trimethyl phosphite
Triethyl phosphite
Tri-isopropyl phosphite
Tri-iso-octyl phosphite
Tri-n-butyl phosphite
Tris(2-ethylhexyl) phosphite
Trisdecyl phosphite
Triphenyl phosphite
Tris-nonylphenyl phosphite The Michaelis-Arbusov reaction is suitably carried out in a single step where the hydrocarbyl phosphite is the same in both steps. Advantageously an excess of the phosphite ester is heated with the chloromethyl ester at 150 to 200° C. for 2 to 24 hours or more. Provision is made for escape of by-product hydrocarbyl chloride. In the case of high-boiling chlorides the reflux means is suitably held at a temperature between the boiling point of the hydrocarbyl chloride and the hydrocarbyl phosphite.

The reaction mixture is suitably distilled in vacuo to remove excess phosphite ester and more volatile by-products. The product ester is vacuum distilled overhead, crystallized or recovered as a residual oil.

The acids of this invention are readily obtained by hydrolysis of the esters, suitably by heating with strong hydrochloric acid. Water, alcohol and HCl are conveniently removed under reduced pressure. The acids are first produced as syrupy liquids containing 60 to 80% or more of the acid or glassy solids. Bis(dihydroxyphosphinylmethylene) phosphinic acid was obtained as a crystalline solid melting at 151.5° C.

A variety of salts of the acids of this invention are conveniently prepared by neutralization with appropriate base, evaporation and crystallization from aqueous solution. Heavy metal salts, usually insoluble in water, are produced by metathesis with an excess of a solution of the metal salt. In this way, the exemplary salts shown in Table I are formed. Stannous chloride is used in aqueous solution containing sufficient HCl to prevent hydrolysis. Nitric acid is used with mercuric nitrate for the same reason. The zinc, tin and mercury salts of $H_5P_3O_8(CH_2)_2$, bis(dihydroxyphosphinylmethylene) phosphinic acid, precipitate in strongly acid solution. The copper and cobalt salts are precipitated by mixing the acid with aqueous solutions of inorganic salts of the metal followed by careful addition of caustic to pH 3. The salts are filtered, washed and dried.

In this way salts of the acids of this invention are readily prepared which contain, for example, one or more of the following cations, using the indicated base or salt:

| Cation | Reagent |
|---|---|
| Ammonium | Ammonia (aqueous). |
| Tetramethyl ammonium | Tetramethylammonium hydroxide. |
| Cyclohexyl ammonium | Cyclohexylamine (aqueous). |
| Phenyl ammonium | Aniline (aqueous). |
| Sodium | Sodium hydroxide. |
| Potassium | Potassium hydroxide. |
| Magnesium | Magnesium sulfate. |
| Calcium | Calcium hydroxide. |
| Strontium | Strontium nitrate. |
| Barium | Barium chloride. |
| Zinc | Zinc chloride. |
| Cadmium | Cadmium sulfate. |
| Mercuric | Mercuric nitrate. |
| Ceric | Ceric sulfate. |
| Stannous | Stannous chloride. |
| Cupric | Cupric sulfate. |
| Cobalt | Cobalt sulfate. |
| Iron | Ferric sulfate. |
| Manganese | Manganese chloride. |
| Chromium | Chromic sulfate. |
| Silver | Silver nitrate. |
| Titanium | Titanium chloride. |
| Bismuth | Bismuth nitrate. |
| Zirconyl | Zirconyl chloride. |

The esters of this invention are useful as antioxidants in oxygen-susceptible polymeric compositions and especially as metal deactivators in polypropylene. Electrical conductors and parts, especially those fabricated of copper-bearing metals, for example, copper wire and brass condensers, coated with polypropylene containing esters of this invention, have greatly extended life before failure of the insulation. The esters, acids and salts of this invention are also useful as plant growth regulants, especially as herbicides, nematocides and fungicides. The esters are useful additives in lubricating oils and greases, as corrosion inhibitors in paints and other non-aqueous vehicles and as plasticizers for vinyl polymers. As sequestrants, the acids and salts of this invention are outstanding and are hydrolytically stable at elevated temperatures compared to many known sequestrants. For this reason, these acids and salts are particularly useful in boiler feed water and in water cooling systems to inhibit corrosion. The cerium chelates, particularly described in Examples XXV are especially useful in maintaining cerium dissolved in swimming pool water where cerium stabilizes available chlorine content.

In the following examples, all of the molecular weights marked (VPO) were determined by vapor phase osmometry in benzene solution at 39° C.

EXAMPLE I

Bis(chloromethyl) phosphinic acid chloride

Syrupy bis-hydroxymethylphosphinic acid was dehydrated by heating it to 130° C. at 12 mm. Hg pressure. Seven hundred and fifty grams of thionyl chloride were placed in a two-liter, three-neck flask, equipped with reflux-condenser, CaCl, tube, stirrer and dropping funnel. This was an excess over the theoretical amount necessary to react with 264 g. bis-hydroxymethylphosphinic acid, which was placed into the dropping funnel. An immersion heater in the dropping funnel heated the acid to about 100° C. to reduce the viscosity for addition through the stopcock.

The $SOCl_2$ was heated to 60° C., the stirrer was started and the bis(hydroxymethyl) phosphinic acid was added at a rate producing brisk reflux. Gaseous HCl and $SO_2$ escaped through the condenser. After one hour, the addition was completed and the reflux was continued for about 4 hours until no more gases were evolved. Excess thionyl chloride was removed by distillation and the bis(chloromethyl) phosphinic acid chloride was isolated by vacuum distillation. It boiled at 138° C. at 12 mm. Hg. The yield was 228 g. or 60% of theory. Another 42 grams or 10.2% were obtained at 0.05 mm. Hg, with a boiling point of 95° C.

*Analysis.*—Calcd. for $C_2H_4POCl_3$ (percent): C, 13.24; H, 2.22; P, 17.08; Cl, 58.64. Found (percent): C, 13.20; H, 2.17; P, 16.47; Cl, 58.5.

EXAMPLE II

Bis(chloromethyl) phosphinic acid ethyl ester

Absolute ethanol (135 ml.) was placed in a 2-liter, 2-necked flask equipped with magnetic stirrer, dropping funnel and adapter connected to a water aspirator. The ethanol was stirred and cooled with a salt/ice bath and 237 grams of $(ClCH_2)_2POCl$, prepared as described in Example I were added dropwise within 30 minutes. After the addition was complete, HCl and excess ethanol was pumped away through the water aspirator. During this operation, lasting 1.5 hours, the ice bath was removed and the reaction mixture was gradually heated to 60° C. By vacuum distillation, 268 g. of bis(chloromethyl) phosphinic acid ethyl ester of 93% of the theoretical yield was obtained. Boiling point, 95–98° C. at 0.05 mm. Hg. Melting point, 26° C.

*Analysis.*—Calcd. for $C_4H_9PO_2Cl_2$ (percent): C, 25.15; H, 4.75; P, 16.22; Cl, 37.12. Found (percent): C, 25.25; H, 4.73; P, 16.36; Cl, 37.2.

EXAMPLE III

Bis(chloromethyl) phosphinic acid n-dodecyl ester n-Dodecanol and bis(chloromethyl) phosphinic acid chloride in a molar ratio of 1:1 were reacted as described in Example II, including heating the reaction mixture to 60° C. under the aspirator. The product, undistillable without decomposition even in high vacuum, was isolated as follows: The crude product was dissolved 5 volumes of a mixture of benzene and chloroform 1:1. Excess ammonia gas was passed into this solution. The precipitate of bis(chloromethyl) phosphinic acid ammonium salt was filtered off and the solvents were stripped from the product at reduced pressure. By cooling with an ice salt mixture, the n-dodecyl ester crystallized. The crystals were removed from some mother liquor by centrifugation in a basket centrifuge which was chilled to 0° to prevent melting. The resulting bis(chloromethyl) phosphinic acid n-diodecyl ester melted at about 16° C. and was obtained in 67% yield.

EXAMPLE IV

Bis(chloromethyl) phosphinic acid i-propyl ester

Bis-chloromethylphosphinic acid i-propyl ester was prepared and isolated by vacuum distillation as described in Example II using a molar ratio of reactants of 1:1 and also by the crystallization procedure of Example III. Boiling point, 98° C. at 0.1 mm. Hg. Yield, 86% of theory. This i-propyl ester melted at 8° to 10° C.

*Analysis.*—Calc. for $C_5H_{11}PO_2Cl_2$ (percent): C, 29.29; H, 5.41; P, 15.11; Cl, 34.58. Found (percent): C, 29.35; H, 5.39; P, 15.21; Cl, 34.6.

EXAMPLE V

Bis(chloromethyl) phosphinic acid n-butyl ester

Normal butyl alcohol (80 g.; 1.08 moles) was placed in a 1 liter, 2-necked flask equipped with a stirrer and a dropping funnel with side arm. While the flask and contents were cooled in an ice-salt mixture to −15° C., 181 grams (1 mole) of bis(chloromethyl) phosphinic acid chloride, product of Example I was dropped in with stirring during a period of 45 minutes. A water aspirator was attached to the side arm of the funnel and the HCl was pumped away while raising the bath temperature to 55° C. Vacuum distillation gave 189 g. or 86% of theoretical yield of bis(chloromethyl) phosphinic acid n-butyl ester boiling at 106° to 110° at 0.07 mm. Hg.

EXAMPLE VI

Bis(chloromethyl) phosphinic acid phenyl ester

Into a flask fitted with a gas inlet tube, magnetic stirring bar, gas outlet, adapter and a gas washing flask charged with 100 ml. of sodium hydroxide solution to absorb evolved hydrogen chloride was placed 9.4 g. (0.1 mole) phenol and 18.1 g. (0.1 mole) bis(chloromethyl) phosphinic acid chloride, the product of Example I. The reaction mixture was heated to 150° for 4 hours under nitrogen. Evolved HCl was absorbed in the base and amounted to 93% of the theoretical. The resulting bis(chloromethyl) phosphinic acid phenyl ester distilled constantly at 138° C. at 0.15 mm. Hg. A yield of 16.5 g. or 69% of theory was obtained.

EXAMPLE VII

Bis(diethoxyphosphinylmethylene) phosphinic acid methyl ester

Bis(chloromethyl) phosphinic acid methyl ester was prepared in a manner analogous to the preparation of the ethyl ester as described in Example II. A mixture of 17.7 g. (0.1 mole) of the methyl ester and 60 g. (0.36 mole) of triethyl phosphite was heated under nitrogen at 180° C. for 21 hours. Vacuum fractionation yielded 20.2 g. or 53% of the theoretical yield of bis(diethoxyphosphinylmethylene) phosphinic acid methyl ester boiling at 186 to 188° C. at 0.15 mm. Hg.

*Analysis.*—Calc. for $C_{11}H_{27}P_3O_8$ (380) (percent): C, 34.75; H, 7.16; P, 24.44. Found (percent): C, 35.87; H, 7.24; P, 23.42. Mol. wt. 381 (VPO).

EXAMPLE VIII

Bis(diethoxyphosphinylmethylene) phosphinic acid ethyl ester

The apparatus consisted of a 500 ml round bottom flask, equipped with a liebig type reflux condenser. Through the center of the condenser a thin glass tubing was placed, reaching the bottom of the flask. It was made airtight on top by a suitable T piece having ground joints. To the side arm of this adapter was connected a trap, cooled by Dry Ice. During the reaction a slow stream of nitrogen was passed through the center tube into the reaction mixture to prevent air oxidation and to remove the volatile ethyl chloride by-product.

Into the flask were charged 128.5 grams (0.67 mole) of bis(chloromethyl) phosphinic acid ethyl ester, prepared as described in Example II and 255 grams (1.54 moles) of triethyl phosphite. The mixture was heated to reflux by an oil bath maintained at 180° C.

After heating for 10 hours, 65% of the theoretically expected 86.5 grams of ethyl chloride was found in the trap. The contents of the flask were vacuum distilled to a temperature of 90° C. at 1 mm. Hg. Then 125 ml. of fresh triethyl phosphite was added to the residue and the mixture was refluxed in the apparatus described above in this example for an additional 5 hours.

On vacuum distillation, 231 grams of the desired ester were obtained, which is 87.5% of the theoretical yield. The resulting bis(diethoxyphosphinylmethylene) phosphinic acid ethyl ester distilled at 172–174° C. at 0.05 mm. Hg and at 180–182° C. at 0.15 mm. Hg.

*Analysis.*—Calcd. for $C_{12}H_{29}P_3O_8$ (394.3) (percent): C, 36.56; H, 7.41; P, 23.57. Found (percent): C, 36.71; H, 7.38; P, 23.60. Mol. wt. 392 (VPO).

EXAMPLE IX

Bis(di-i-propoxyphosphinylmethylene) phosphinic acid ethyl ester

Using the apparatus and procedure of Example V, a mixture of 30 grams (0.156 mole) of bis(chloromethyl) phosphinic acid ethyl ester, prepared as described in Example II and 100 grams (0.48 mole) of tri-i-propyl phosphite was refluxed at 180° C. for 10 hours. Vacuum distillation yielded 23.5 grams of material distilling at 150–176° C. at 0.14 mm. Hg. This mixture and 55 grams (0.26 mole) of additional tri-i-propyl phosphite was refluxed at 180° C. for 9 hours. Vacuum distillation yielded 15 grams or 48% of theory of bis(di-i-propoxyphosphinylmethylene) phosphinic acid ethyl ester boiling at 164° C. at 0.01 mm. Hg.

*Analysis.*—Calcd. for $C_{16}H_{37}P_3O_8$ (450.4) (percent): C, 42.67; H, 8.28; P, 20.63. Found (percent): C, 42.17; H, 8.27; P, 20.20. Mol. wt. 419 (VPO).

EXAMPLE X

Bis(di-i-propoxyphosphinylmethylene) phosphinic acid i-propyl ester

Following the procedure of Example VIII, a mixture of 30 grams (0.15 mole) of bis(chloromethyl) phosphinic acid i-propyl ester, prepared as described in Example IV and 75 grams (0.34 mole) of tri-i-propyl phosphite was refluxed for 10 hours at 180° C. Vacuum distillation gave 14 grams of material boiling at 145–172° C. at 0.1 mm. Hg. This mixture was refluxed with an additional 35 grams of tri-i-propyl phosphite for 10 hours at 180° C. Vacuum distillation gave 10 grams of bis(di-i-propoxyphosphinylmethylene) phosphinic acid i-propyl ester boiling at 174° C. at 0.11 (0.15) mm. Hg. On redestillation, it boiled at 160° C. at 0.01 mm. Hg. The product crystallized at room temperature and melted at 38° C.

*Analysis.*—Calc'd for $C_{17}H_{39}P_3O_8$ (464) (percent): C, 43.97; H, 8.46; P, 20.01. Found (percent): C, 43.33; H, 8.45; P, 20.36. Mol. wt. 452 (VPO).

EXAMPLE XI

Bis(diethoxyphosphinylmethylene) phosphinic acid n-dodecyl ester

Using the apparatus and procedure of Example VIII, a mixture of 17.6 grams (0.053 mole) of bis-chloromethyl) phosphinic acid n-dodecyl ester, prepared as described in Example III and 29 grams (0.175 mole) of triethyl phosphite was refluxed for 10 hours at 180° C. The reaction mixture was vacuum distilled to remove material boiling below 200° C. at 0.1 (0.15) mm. Hg. The residual bis (diethoxyphosphinylmethylene) phosphinic acid lauryl ester was a slightly yellow oil and amounted to 25.9 grams or 92% of theoretical.

*Analysis.*—Calc'd for $C_{22}H_{49}P_3O_8$ (534) (percent): C, 49.43; H, 9.24; P, 17.38. Found (percent): C, 49.45; H, 9.38; P, 17.29. Mol. wt. 537 (VPO).

EXAMPLE XII

Bis(di-n-butoxyphosphinylmethylene) phosphinic acid n-butyl ester

Using the apparatus of Example VIII, a mixture of 21.9 g .(0.1 mole) of bis(chloromethyl) phosphinic acid n-butyl ester, prepared as described in Example V and 60 g. (0.24 mole) of tri-n-butyl phosphite was heated at 170° C. for 18 hours. The reflux condenser was maintained at 78–88° C. to remove the n-butyl chloride byproduct from the reaction mixture. After the first 5 hours, 20 g. (0.08 mole) of additional tri-n-butyl phosphate was added to insure the presence of an excess. The mixture was vacuum distilled to yield 12.6 g. or 24% of theory of bis(di-n-butoxyphosphinylmethylene) phosphinic acid n-butyl ester which distilled at 179°–82° C. at 0.12 mm. Hg. An additional 9.7 grams was recovered, boiling up to 224° C. with decomposition at 0.12 mm. Hg.

*Analysis.*—Calc'd for $C_{22}H_{49}P_3O_8$ (534.5) (percent): C, 49.43; H, 9.24; P, 17.38. Found (percent): C, 49.37, 49.21; H, 9.03, 8.61; P, 17.4, 17.41. Mol. wt. 532 (VPO).

EXAMPLE XIII

Bis(diethoxyphosphinylmethylene) phosphinic acid phenyl ester

Using the apparatus of Example VIII, a mixture of 16.3 g. (0.0682 mole) of bis(chloromethyl) phosphinic acid phenyl ester, prepared as described in Example VI, and 43 g. (0.259 mole) of triethyl phosphite was refluxed for 7 hours at about 175° C. The resulting bis-diethoxyphosphinyl-methylenephosphinic acid phenyl ester distilled at 212° to 218° C. at 0.12 mm. Hg. Yield, 16.7 g. or 55% of theory.

*Analysis.*—Calc'd for $C_{16}H_{29}P_3O_8$ (442) (percent): C, 43.45; H, 6.61; P, 20.01. Found (percent): C, 42.71, 42.50; H, 6.77, 6.53; P, 20.14, 20.32. Mol. wt. 470 (VPO).

EXAMPLE XIV

Bis(dihydroxyphosphinylmethylene) phosphinic acid

A mixture of 172 g. of the product of Example VIII, bis(diethoxyphosphinylmethylene) phosphinic acid ethyl ester and 1100 ml. of concentrated hydrochloric acid was refluxed for 20 hours. Water, alcohol and HCl were removed by distillation at 100° C. at 0.1 mm. Hg. The acid thus obtained was a thick syrupy liquid at 100° which solidified to a sticky glass at room temperature. It was diluted with water to form a concentrated solution of 60–80% strength. It was most conveniently handled in this form.

On prolonged standing of the above sample, crystalline material separated and it was used for seed the following procedure: 40 ml. of 60% bis(dihydroxyphosphinylmethylene) phosphinic acid was vacuum evaporated at 35–40° C. To the thick oil was added a few seed crystals and the concentration was continued. Within two hours after seeding, a crystal slurry resulted. The slurry was agitated with a solution of 120 ml. of glacial acetic acid, 100 ml. of acetone and 20 ml. of methanol at 0° C. After two hours the crystals were filtered, washed with 50 ml. of glacial acetic acid and then 100 ml. of acetone and dried in vacuo at 0.5 mm. Hg. at 100° C. for one hour. The resulting bis(dihydroxyphosphinylmethylene) phosphinic acid was a free flowing, crystalline product melting at 151.5° C. Yield 15 g. On titration, the equivalent weight found when 3 equivalents were titrated was 86.3 indicating a formula weight of 258.9 units. When 4 equivalents were titrated, equivalent weight was 64.5 and formula weight was 258, corresponding to a calculated formula weight for $H_5P_3O_8(CH_2)_2$ of 254.

EXAMPLE XV

Bis(dihydroxyphosphinylmethylene) phosphinic acid triammonium salt

Ammonia was passed into a 70% solution of bis(dihydroxyphosphinylmethylene) phosphinic acid, prepared as described in Example XIV. The acid was neutralized and the triammonium salt crystallized out from the concentrated solution. It was filtered, washed with alcohol and dried over $CaCl_2$ at reduced pressure.

*Analysis.*—Calc'd for $C_2H_{18}N_3P_3O_8$ (percent): C, 7.87; H, 5.95; N, 13.77; P, 30.46. Found (percent): C, 7.83; H, 6.23; N, 12.90; P, 29.15.

EXAMPLE XVI

Bis(dihydroxyphosphinylmethylene) phosphinic acid trisodium salt

A concentrated (80%) solution of (0.3 ml.) of bis(dihydroxyphosphinylmethylene) phosphinic acid, product of Example XIV was diluted to 20 ml. and 10% NaOH solution was added until the pH was exactly 5.6 by a glass electrode immersed in the solution. The volume was adjusted to 30 ml. by evaporating excess water. While cooling with ice, 200 ml. of methanol were added slowly. The precipitated crystals of bis(dihydroxyphosphinyl methylene) phosphinic acid trisodium salt were filtered, washed with methanol (50 ml.) and ether (50 ml.) and dried in vacuo over $CaCl_2$.

Analysis.—Calcd. for $C_2H_6P_3O_8Na_3$ (percent): P, 29.0; Na, 21.8; P:Na=1:1. Found (percent): P, 26.80; Na, 21.11; P:Na=1:1.06.

EXAMPLE XVII

Bis(dihydroxyphosphinylmethylene) phosphinic acid tetrasodium salt

In the manner of Example XVI, another sample of bis(hydroxyphosphinylmethylene) phosphinic acid was neutralized to pH 8.9 and the solution was evaporated under reduced pressure to 30 ml. On cooling and crystallizing with methanol as in Example XVI bis(dihydroxyphosphinylmethylene) phosphinic acid tetrasodium salt was obtained.

Analysis.—Calcd. for $C_2H_5P_3O_8Na_4$ (percent): P, 26.85; Na, 26.90; P:Na=3.4. Found (percent): P, 25.50; Na, 25.41; P:Na=3:4.02.

EXAMPLE XVIII

Bis(dihydroxyphosphinylmethylene) phosphinic acid potassium salts

In the manner of Example XVI, portions of bis(dihydroxyphosphinylmethylene) phospinic acid were neutralized to pH 5.6, 8.9 and 12 with aqueous KOH. The potassium salts were precipitated as oils by addition of 1:1 (volume) mixtures of methanol and ethanol. Dried in vacuo, the potassium salts were very hydroscopic. The acid neutralized to pH 5.6 yielded bis(dihydroxyphosphinylmethylene) phosphinic acid tripotassium salt; the acid neutralized to pH 8.9 yielded bis(dihydroxyphosphinylmethylene) phosphinic acid tetrapotassium salt; and the acid neutralized to pH 12 yielded bis(dihydroxyphosphinylmethylene) phosphinic acid pentapotassium salt.

EXAMPLE XIX

Bis(dihydroxyphosphinylmethylene) phosphinic acid trisilver salt

A solution of 2 g. of bis(dihydroxyphosphinylmethylene) phosphinic acid pentasodium salt having the formula $Na_5P_3O_8(CH_2)_2 \cdot H_2O$, prepared in a manner similar to that described in Example XVI but neutralizing the acid to pH 11, was prepared by dissolving the salt in 50 ml. of water. Nitric acid was added to bring the pH to 1 and excess 20% aqueous silver nitrate was added. More nitric acid was added until most of the precipitate dissolved. A small amount of undissolved silver chloride was removed by filtration. Dilute aqueous ammonia was added to the filtrate to pH 4.5 and the reprecipitated silver salt was filtered, washed with water and methanol and dried. Yield 2.7 g.

Analysis.—Calcd. for $C_2H_6P_3O_8Ag_3$ (percent): C, 4.18; H, 1.05; P, 16.17; Ag, 56.3. Found (percent): C, 4.02; H, 1.06; P, 15.63; Ag, 58.0.

EXAMPLE XX

Bis(dihydroxyphosphinylmethylene) phosphinic acid tetracyclohexylammonium salt

To 2 ml. of an approximately 60% aqueous solution of bis(dihydroxyphosphinylmethylene) phosphinic acid was added 3 ml. of cyclohexylamine. During this neutralization heat was evolved and a precipitate appeared. While stirring the mixture, water was added dropwise until the precipitate just disappeared. Then alcohol was added until turbidity just disappeared. The mixture was cooled overnight and the tetracyclohexylammonium salt of bis(dihydroxyphosphinylmethylene) phosphinic acid crystallized in long needles. The crystals were filtered, washed with 20 ml. of ether and dried in vacuo over $P_4O_{10}$.

Analysis.—Calcd. for $C_{26}H_{61}N_4P_3O_8$ (percent): C, 47.99; H, 9.45; N, 8.61; P, 14.28. Found (percent): C, 47.46, 47.41; H, 9.37, 9.49; N, 8.67, 8.69; P, 14.37, 14.41. Calc.: C:H:N:P=26:61:4:3. Found: 25.5:60.4:4:3.

EXAMPLE XXI

Bis(dihydroxyphosphinylmethylene) phosphinic acid heavy metal salts

Three ml. of a 60–65% solution of bis(dihydroxyphosphinylmethylene) phosphinic acid was diluted with 10 ml. water. With stirring a 10% aqueous solution of heavy metal salt was added dropwise, until an excess was present in the supernatant solution. The precipitated salts were filtered, washed with water until the filtrate was acid-free, then with 50 ml. of ethanol and dried in vacuo over $CaCl_2$.

(A) Zinc salt.—10% aqueous zinc chloride was used as reagent.

Analysis.—Calcd. for $C_2H_5P_3O_8Zn_2$ (percent): P, 24.41; Zn, 34.27; P:Zn=3:2. Found (percent): P, 22.35, 22.41; Zn, 30.3; P:Zn=3:1.92.

(B) Stannous salt.—Sufficient HCl was added to 10% aqueous stannous chloride to prevent hydrolysis and the acid solution was used as reagent.

Analysis.—Calcd. for $C_4H_8P_6O_8Sn_5$ (percent): P, 17.03; Sn, 54.38; P:Sn=6:5. Found (percent): P, 16.38, 16.42; Sn, 49.4; P:Sn=6:4.82.

(C) Mercury salt.—The reagent was 10% aqueous mercuric nitrate containing sufficient $HNO_3$ to prevent hydrolysis. This salt showed an analysis 9.2 % P, 69.0% Hg and P:Hg=1:1.46.

(D) Copper salt.—The reagent, 10% aqueous copper sulfate was added to the acid and the pH of the solution was raised to 3 by slow addition of 5% aqueous sodium hydroxide to precipitate the copper salt.

Analysis.—Calcd. for $C_2H_5P_3O_8Cu_2$ (percent): P, 24.64; cu, 33.70; P:Cu=3:2. Found (percent): P, 23.39, 23.57; Cu, 29.5; P:Cu=3:1.84.

(E) Cobalt salt.—This salt, prepared as described for the copper salt, showed on analysis 22.8% P, 9.3% Co and P:Co=3:0.65.

EXAMPLE XXII

Sequestration by $H_5P_3O_8(CH_2)_2$

Sequestration values for calcium were determined in the presence of oxalate ion, by the procedure published in J. Am. Oil Chem. Soc. 39, 156–59 (1962). At a pH of 10 the following results were obtained:

| Sequestrant | Ca Sequestration g./10 g. |
|---|---|
| (a) $H_5P_3O_8(CH_2)_2$ | 13.5 |
| (b) Triammonium salt of (a) | 12 |
| (c) Pentasodium salt of (a) | 9.5 |
| (d) $O{=}P(CH_2PO_3H_2)_3$ | 13.8 |
| (e) Hexasodium salt of (d) | 9.9 |

Using the same technique, the sequestration properties of $H_5P_3O_8(CH_2)_2$ was compared with those of tripolyphosphoric acid at various pH values. (Their respective molecular weights differ by only 4 units.) At pH 10, as shown above, 13.5 g. of calcium was sequestered by 100 g. of $H_5P_3O_8(CH_2)_2$ while 100 g. of polyphosphoric acid under the same conditions sequestered only 10.8 g. of calcium.

The chelating properties were also checked by the pH lowering method. Titrations of the acid in the presence and absence of a metal ion which is chelated, show apparent dissociation constants which differ due to release of H+ by the chelating reaction. The greater this difference the stronger is the complex.

The $\Delta pK_5$ and $\Delta pK_4$ were measured for $H_5P_3O_8(CH_2)_2$ in the presence of equimolar amounts of calcium or copper ions. The values obtained were:

$Ca^{++}\Delta pK_5=2.19 \quad \Delta pK_4=1.64$
$Cu^{++}\Delta pK_5=3.30 \quad \Delta pK_4=2.90$ These data show formation of a calcium chelate and a stronger copper chelate. No precipitates were observed if no excess metal ions were present.

The hydrolytic stability of the $Ce^{4+}$ complex with $H_5P_3O_8(CH_2)_2$ at pH 7 was compared with that of the tripolyphosphate complex. Solutions containing $10^{-3}$ mole $Ce^{4+}$ and $2.1 \times 10^{-3}$ moles $H_5P_3O_8(CH_2)_2$ or $H_5P_3O_{10}$, respectively, were adjusted to pH 7 and heated to 80° for 12 hours. The $Ce^{4+}$-tripolyphosphate complex was decomposed with formation of a precipitate, while the complex with $H_5P_3O_8(CH_2)_2$ was stable and the solution remained clear. The latter solution also remained clear for more than six months at room temperature.

EXAMPLE XXIII

Stabilization of polypropylene

Polypropylene is a widely used plastic, especially useful for electrical insulation. However, atmospheric oxygen, especially in contact with copper or brass, causes rapid deterioration and loss of desirable properties. Commercially useful polypropylene is conventionally stabilized by addition of antioxidants. In addition, copper deactivators are essential for adequate protection. The test described below was used to show the utility of the novel compounds of this invention as copper deactivators used in conjunction with antioxidants to stabilize polypropylene.

Test procedure.—A master batch of resin (Profax 6301 polypropylene), antioxidant and deactivator was prepared by weighing the desired amount of additives and resin into a beaker and mixing thoroughly with a spatula. One gram samples from the master batch were placed in 20 ml. beakers for fusing. The resin mixture was packed tightly into the beaker and the beaker was flushed with nitrogen for 1 minute. The beaker was heated on a hot plate set at approximately 240° C. for one minute under flowing nitrogen and an additional three minutes under still nitrogen. The resulting fused polypropylene disk was 2.8 cm. in diameter and 1.5–2.0 mm. in thickness.

In the "copper powder" test, 1.4% of very fine copper powder was added to the resin mixture. The resulting tablet was oven-aged at 140° C. in air until the sample became brittle or charred.

In the "copper wire" test, a length of copper wire was covered with fused polypropylene and oven-aged in air at 140° C. until the covering became brittle. The wire coatings were prepared by placing a 4 cm. of number 16 copper wire in a piece of glass tubing 6 cm. long and 5 mm. O.D. Polypropylene resin mixed with desired additives was poured into the tube maintaining the wire in the center of the tubing. The assembly was placed on a hot plate preheated to 240° C. for two minutes to fuse the resin. Since the resin shrinks, the tube is refilled with resin and fused for an additional two minutes. The coated copper wire is then removed from the glass tubing and oven-aged in air at 140° C. to failure.

Test results.—In accompanying Table II, Tests 1, 2 and 3 were conducted as described above in the copper powder test and Tests 4 and 5 were conducted as described in the copper wire test. In Test No. 1b, the polypropylene composition containing the product of Example VIII showed a life of 60 days, 8 times as long as the 8 days shown by the composition in Test No. 1a containing an equal amount of oxanilide, a commercially used copper deactivator.

Test No. 2b shows the life of the polypropylene composition containing the product of Example VIII was extended to 26 days, about 5 times the 5 day life of a similar composition, tested in Test No. 2a, not containing the product of Example VIII.

Test No. 3b shows the extended life of 69 days in a polypropylene composition containing 2% of the product of Example XI, more than 8 times the life of 8 days in an otherwise similar polypropylene composition containing 2% of oxanilide.

Test No. 4b shows the extended life of a polypropylene composition containing 1% of the product of Example XI and 1% of Antioxidant C, a commercial antioxidant compared with a similar composition in Test No. 4a not containing the product of Example XI.

Test No. 5a shows the deleterious effect of carbon black on the stability of polypropylene and Test No. 5b shows that commercial Antioxidant D gave some improvement in stability. Test No. 5c shows the marked improvement in stability obtained by additionally incorporating in the composition 1% of the product of Example XI.

Similarly useful improved results were obtained incorporating the products of Examples VII, IX, X, XII, and XIII.

TABLE II

| Test No. | Carbon, percent | Antioxidants[1] | | | | Deactivators[2] | | | | Days |
|---|---|---|---|---|---|---|---|---|---|---|
| | | A | B | C | D | E | F | G | H | |
| 1a | | | 1 | | | | | | 2 | 12 |
| 1b | | | 1 | | | | 2 | | | 60 |
| 2a | | | | 1 | | | | | | 5 |
| 2b | | | | 1 | | | 1 | | | 26 |
| 3a | | 1 | | | | | | | 2 | 12 |
| 3b | | 1 | | | | | 2 | | | 69 |
| 4a | | | | 1 | | | | | | 6 |
| 4b | | | | 1 | | | | 1 | | 16 |
| 5a | 1.5 | | | | | | | | | 0.2 |
| 5b | 1.5 | | | | 1 | | | | | 3.2 |
| 5c | 1.5 | | | | 1 | | | 1 | | 17 |

[1] Antioxidants: (A) "Santowhite," 2,2'-thiobis(6-isobutyl-paracresol); (B) Ethyl 702, 4,4'-thiobis(2,6-ditert.-butylphenol); (C) CAO-5, 2,2'-methylene bis (6-tert.-butylcresol); (D) dilauryl thiodipropionate.
[2] Copper deactivators: (E) Product of Example VIII; (F) Product of Example XI; (G) Ethyl 796, tris (3,5-ditert.-butyl-4-hydroxyphenyl) phosphate; (H) oxanilide.

What is claimed is:
1. A composition of matter having the formula:

$$[(RO)_2P(:O)CH_2]_xP(:O)(OR')_{3-x}$$

where $x$ is 2 and the R and R' are independently selected from the group consisting of H, metal, alkyl, cycloalkyl, aryl and alkaryl of 1 to 18 carbons, $NH_4$, $NH_3NH_2$ and ammonium substituted by alkyl, cycloalkyl, aryl and alkaryl of 1 to 18 carbons.

2. A composition as claimed in claim 1 in which all of R and R' are independently selected from the group consisting of alkyl, cycloalkyl, aryl and alkaryl of 1 to 18 carbons.

3. A composition as claimed in claim 2 in which R and R' are alkyl of 1 to 12 carbons.

4. A composition as claimed in claim 3 in which R is ethyl and R' is n-dodecyl.

5. A composition as claimed in claim 3 in which all of R and R' are ethyl.

6. A composition as claimed in claim 1 in which all R and R' are hydrogen.

7. A composition as claimed in claim 1 in which at least one R is metal.

8. A composition as claimed in claim 7 in which at least one R is alkali metal and the remaining R are hydrogen.

9. A composition as claimed in claim 7 in which R' and two R are sodium and two R are hydrogen.

10. A composition as claimed in claim 1 in which R' and two R are cyclohexylammonium and two R are hydrogen.

References Cited

UNITED STATES PATENTS 3,420,917  1/1969  Wu _____ 260—932

CHARLES B. PARKER, Primary Examiner

A. H. SUTTO, Assistant Examiner

U.S. Cl. X.R.

71—86; 161—216; 252—49.8, 389; 260—30.6, 45.7, 429, 429.2, 429.3, 429.5, 429.7, 429.9, 430, 431, 438.1, 438.5, 439, 447, 501.12, 502.4, 923, 924, 925, 969, 999

PO-1050
(5/69)

UNITED STATES PATENT OFFICE
CERTIFICATE OF CORRECTION

Patent No. 3,534,125　　　　　　　　Dated October 13, 1970

Inventor(s) Karl O. Knollmueller

It is certified that error appears in the above-identified patent and that said Letters Patent are hereby corrected as shown below:

Columns 1 and 2, Table I, delete the last line of Table I. Column 5, line 67, "diodecyl" should read --dodecyl--. Column 6, line 20, following "110°", insert --C.--. Column 7, line 44, "redestillation" should read --redistillation--; line 55, "bis-chloromethyl)" should read --bis(chloromethyl)--. Column 8, line 43, "for seed" should read --as seed for--. Column 9, line 24, "(hydroxyphosphinylmethylene)" should read --(dihydroxyphosphinylmethylene)--; line 31, "3.4" should read --3:4--. Column 10, line 5, disappeared" should read --appeared--; line 39, "an" should read --on--; line 46 "cu" should read --Cu--; line 59, "10" should read --100--.

DEC 29 1970

(SEAL)
Attest:

Edward M. Fletcher, Jr.
Attesting Officer

WILLIAM E. SCHUYLER, JR.
Commissioner of Patents

Notice of Adverse Decision in Interference

In Interference No. 97,778 involving Patent No. 3,534,125, K. O. Knollmueller, BIS(PHOSPHINYL)PHOSPHINATES, final judgment adverse to the patentee was rendered Nov. 1, 1973, as to claims 1, 5 and 6.

[*Official Gazette July 2, 1974.*]